(No Model.) 2 Sheets—Sheet 1.
P. E. LITTLE.
DISK HARROW.
No. 431,370. Patented July 1, 1890.
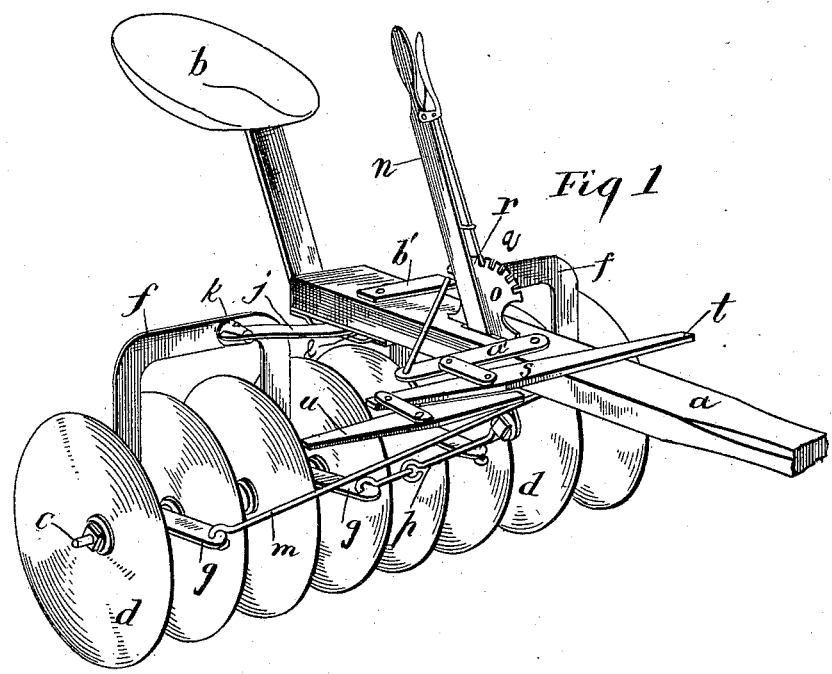
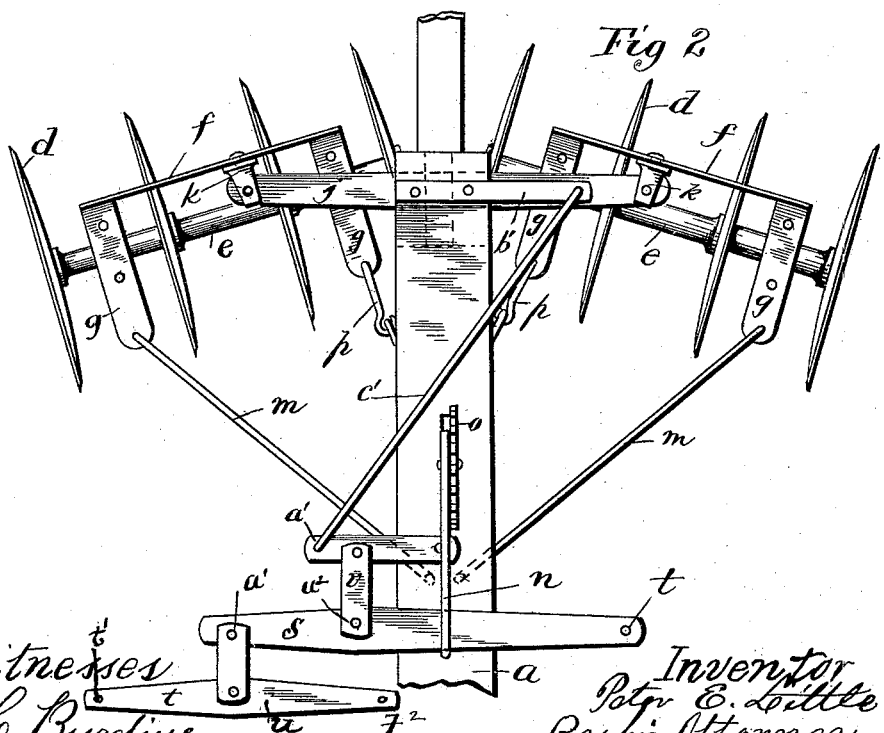
Witnesses
C. C. Burdine
H. E. Peck
Inventor
Peter E. Little
By his Attorney
O. E. Duffy

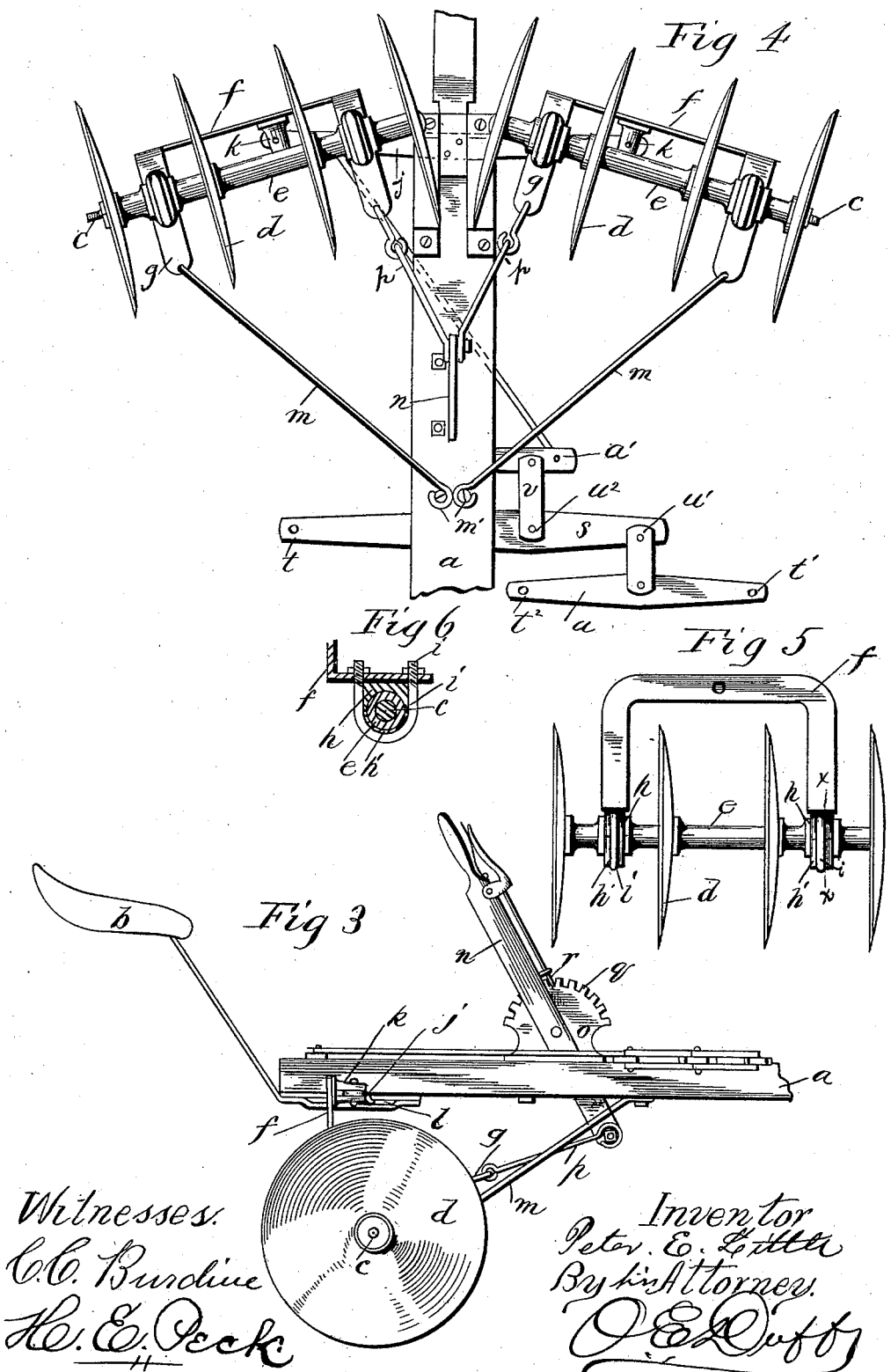

UNITED STATES PATENT OFFICE.

PETER E. LITTLE, OF DAYTON, OHIO.

DISK HARROW.

SPECIFICATION forming part of Letters Patent No. 431,370, dated July 1, 1890.

Application filed November 1, 1889. Serial No. 328,907. (No model.)

*To all whom it may concern:*

Be it known that I, PETER E. LITTLE, of Dayton, in the county of Montgomery and State of Ohio, have invented certain new and useful Improvements in Disk Harrows; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to certain improvements in disk harrows.

The object of the invention is to provide an improved disk harrow exceedingly cheap, simple, and durable in construction, composed of a minimum number of strong and durable parts securely joined together, wherein the draft on the horses will be very light and connected directly with the centers or axles of the disks, avoiding downward drag on the necks of the horses, wherein the series or gangs of disks can swing vertically or horizontally and can be easily and with a minimum amount of labor adjusted to any angle; and a further object is to provide the harrow with an improved equalizer, whereby three horses can be used abreast without side-thrust on the tongue or draft-pole.

These objects are accomplished by, and my invention consists in, certain novel features of construction and in combinations of parts, more fully described hereinafter, and particularly pointed out in the claims.

Referring to the accompanying drawings, Figure 1 is a perspective view of the harrow with the inner ends of the disk-gangs drawn forward, so that the disks will cut shallow. Fig. 2 is a top plan with the inner ends of the disk-gangs adjusted to their limit of motion in the opposite direction. Fig. 3 is an end view of the harrow with the disks adjusted as shown in Fig. 1. Fig. 4 is a bottom plan view. Fig. 5 is a detail elevation of one of the disk sections or gangs and its yoke or frame. Fig. 6 is a section on the line $x\ x$, Fig. 5.

In the drawings, the reference letter $a$ indicates the draft pole or tongue carrying the seat $b$.

The present harrow is provided with two separately-movable gangs of revolving, preferably concavo-convex, disks $d$, each gang consisting of a suitable number of disks. The disks of each gang are clamped together upon a central shaft $c$ by means of the sleeves or collars $e$ on the shaft, having flanges at their ends abutting against the disks and clamping the same together, as usual. Each gang is provided with a vertical substantially U-shaped yoke or frame $f$, formed integral and extending above the disks, and at its ends provided with horizontal forwardly-extending arms $g\ g$. The length of each frame $f$ is preferably such that the arms $g\ g$ are located above the gang-shaft near the ends thereof. The end sleeves $e$ of each gang are provided with peripheral grooves, and a pair of corresponding upper and lower blocks $h\ h'$ loosely embrace said sleeves and rest in said grooves, and each pair of blocks is clamped together and secured to an arm $g$ of the frame $f$ by means of a U-bolt $i$, embracing the blocks and having its legs extended through said arms and secured by bolts on the upper side of the same, so that the disks and their sleeves can freely rotate in said blocks and yet will be held from longitudinal play therein. The two gangs on opposite sides of the end of the tongue are loosely connected to the tongue and together by means of the horizontal connecting-bar $j$, at its opposite ends connected by universal joints or connections to the upper portions of the two frames of the gangs, to allow independent vertical and horizontal swing of the gangs, and each of said universal joints is composed of a horizontal stud $k$, at one end rotatively secured to the center of the upper portion of a gang-frame and horizontally slotted at its outer end to receive an end of said connecting-bar $j$, which is pivoted in said slotted end, so that the gang can swing vertically on the stud and can swing horizontally on the end of said connecting-bar. At its center this connecting-bar extends through and is confined in a transverse slot $l$ on the under side of the rear end of said tongue, and this slot is of such width that the connecting-rod can slide back and forth in the same a suitable distance. A pair of separate rigid draft-rods $m\ m$ at their front ends are pivoted to the under side of the tongue at $m'$ $m'$ a distance in front of the gangs, and these rods extend rearwardly to the outer ends of the opposite gangs, and at their rear ends are loosely secured to the front ends of the outer arms $g$ of their respective gangs to hold the same and yet allow their inner ends to swing back and forth in the direction of draft. A vertical lever $n$ is pivoted within its length to an upright bracket $o$, secured to the tongue, and extends a distance above said tongue and through a transverse slot in the same to a distance below the tongue in front of the disks and to the rear of the pivotal-points $m'$ of the draft-rods $m$. A pair of draft-rods or connections $p$ $p$ are loosely secured at their front ends to the lower end of said adjusting-lever, while their lower ends extend rearwardly in opposite directions and are loosely secured, respectively, to the front of the arms $g$ at the inner ends of the two gangs, as shown. The upper edge of said bracket $o$ is provided with a series of ratchet-teeth $q$, and the lever carries a pawl $r$, to engage the ratchet-teeth and hold the lever in the desired adjustment, and said pawl is provided with a spring hand-clip to operate the same, as shown.

From the foregoing it will be readily seen that when it is desired to have the inner ends of the gangs adjusted to their limit of forward movement, and thus all the disks substantially in one line and parallel with the line of draft, so as to run easy with a minimum amount of scraping, the upper or handle end of the adjusting-lever is swung rearwardly, thus drawing the inner ends of the gangs forward by means of the inner draft-rods $p$ $p$, and also drawing the connecting-rod forward to the front end of the slot $l$ on the tongue, the outer ends of the gangs being held stationary by means of the rigid draft-rods $m$ $m$. When it is desired to allow the inner ends of the gangs to swing to their limit of rearward movement and present the sharp cutting-edges of the disks to the ground at an angle to the line of draft, and thus cut deep and scrape and pulverize the soil, the pawl of the lever is released and the free end of the lever thrown forward, and the draft on the disks will automatically swing the gangs rearwardly to their limits of rearward movement, also forcing the connecting-bar to the rear end of the slot of the tongue. Of course the disks can be held at any desired angle by means of the lever and pawl. By reason of their universal connection with the connecting-bar the gangs can independently conform to unevenness or undulations of the surface of the ground. It will be readily observed that the disk-gangs are loosely secured together to allow independent horizontal and vertical swing, and are loosely confined to the rear portion of the draft-pole or tongue to allow joint and simultaneous movement of the gangs in the line of draft independent of said tongue by the support $j$, and that the draft on the gangs is from, and the gangs are secured to, the tongue by the draft rods or connections $m$ $p$, secured to the gang-axles and to the tongue a distance from its rear end. The gangs swing on their points of securing to the stationary draft-connections $m$ $m$, and the connecting-bar or support $j$ moves back and forth in the line of draft independent of the tongue when the free inner ends of the gangs are adjusted horizontally. The angle of the disks can be changed with great ease and rapidity, as the driver has only to draw the disks forward, while the draft on the machine carries them back to their limit of rearward movement, when the lever is released without exertion of force on the part of the operator. By means of the draft-rods the draft is attached directly to the axles of the disks, and hence there is no downward strain on the necks of the animals, as where the draft is on the disks from a distance above the same.

The present harrow is shown provided with a three-horse equalizer, so that two horses can be located on one side of the tongue and one horse on the other side, and yet there will be no side-thrust on the tongue, and this equalizer consists of the elongated tripletree $s$, extending a suitable distance on both sides of the tongue, and at one end, at $t$, the single horse is attached, and at the other end a doubletree $u$ is loosely pivoted at $u'$, to the opposite ends of which doubletree the other two horses are attached at $t'$ $t^2$. This tripletree extends loosely across the tongue, and at a point $u^2$ a distance from point $u'$ equal to one-third of the distance between points $u'$ and $t$ the tripletree is loosely connected by links $v$ with a bar $a'$ parallel with the tripletree, and at its inner end pivotally secured to the tongue, and the outer end of said pivoted bar is connected with the outer end of a bar $b'$, rigidly secured to the rear end of the tongue and extending in an opposite direction therefrom to bar $a'$ by means of a rigid diagonal rod $c'$ loosely connected to the outer end of the bar $a'$ beyond the connection therewith of the links $v$. Thus it will be seen that there is but one pivotal connection with the tongue, and the extra draft on one side of the tongue is transferred to the other side (without side-draft) through the medium of pivoted bar $a'$, rod $c'$, and rigid bar $b'$.

The great cheapness, simplicity, durability, lightness, and ease of operation of this machine are obvious.

It is evident that various changes might be made in the form and arrangement of the parts described without departing from the spirit and scope of my invention; hence I do not wish to limit myself to the peculiar construction herein set forth, but consider myself entitled to all such changes as fall within the spirit and scope of my invention.

Having thus fully described my invention, what I claim, and desire to secure by Letters Patent, is—

1. In a disk harrow, the combination, with the draft-tongue, of two or more disk-gangs on opposite sides of the tongue, said gangs being loosely secured together at their centers to permit horizontal rocking, and loosely connected to the tongue to permit joint and simultaneous movement of the gangs in the line of draft independent of the tongue, and the draft connections or rods extending from the tongue and secured to the gang-axles and provided with means to hold the gangs in the desired adjustment, substantially as described.

2. In a disk harrow, a disk-gang, in combination with an upright yoke loosely connected at its upper center with the draft-tongue and having its lower ends bent forwardly, the gang-axle at its ends being journaled to said bent ends, and the draft rods or connections secured to said bent ends, the connection to one end being stationary and rigid and the connection to the other end being movable to adjust the angle of the gang upon its point of connection with the stationary draft-rod as a center, substantially as described.

3. In a disk harrow, in combination, a draft-tongue, two or more disk-gangs connected loosely together and loosely confined to the rear end of the tongue to allow joint movement of the gangs in the line of draft independently of the tongue, rigid stationary draft-connections from the tongue to corresponding ends of the axles of said gangs and holding said ends to allow the opposite ends to swing, a lock-lever on the tongue, and movable draft-connections from said lever to the opposite and corresponding free ends of the gang-axles, substantially as described.

4. The combination, with the tongue and transverse connecting-bar, of a pair of disk-gangs secured to opposite ends of said bar, each gang being provided with an upright U-yoke mounted on the gang-axle at its ends, a horizontal stud for each yoke rotatively secured to the upper center of its yoke and having its end bifurcated and pivoted on an end of said bar, and the draft-connections and adjusting means from the tongue connected with the gang-axles.

5. In a harrow, a gang of disks, in combination with a yoke connected with the tongue at its upper portion and having its ends bent horizonal, upper and lower blocks loosely embracing the axle of the gang, bolts clamping said blocks together and to said ends of the yoke, and the draft-rods from the tongue secured to said ends of the yoke, substantially as described.

6. In a disk harrow, a tongue having an elongated transverse slot in its rear end, in combination with two or more gangs of disks, a transverse connecting-bar confined in said slot and adapted to slide back and forth in the same in the line of draft, and to the opposite ends of which the gangs are swiveled, and draft rods or connections for the gangs, substantially as described.

7. The combination of the tongue, the two gangs of disks having upwardly-extending yokes, a transverse connecting-bar confined to the tongue, so as to be movable thereon in the line of draft and to the ends of which said yokes are swiveled, rigid or stationary draft-rods from said tongue to the outer ends of the axles of said gangs, a locking-lever on the tongue, and a pair of draft rods or connections secured to the lever and to the inner ends of the axles of said gangs, substantially as described.

8. The combination, with the draft-tongue, of an arm rigidly secured to and extending laterally from the tongue, an arm pivoted at its inner end to the tongue and extending laterally in the opposite direction from said first-mentioned arm, a diagonal rod connecting the outer ends of said two arms, and the tripletree loosely secured to said pivoted arm, as set forth.

9. In combination, the draft-tongue, a pair of disk-gangs, a support for the rear end of said tongue carried by the said gangs and loosely and movably connecting the tongue and said gangs to allow joint and simultaneous movement of the gangs in the line of draft independent of the tongue and the draft rods or connections from the tongue at a distance from its rear end to the axles of the gangs, substantially as described.

10. In a disk harrow, the combination, with the tongue, of two disk-gangs, stationary draft-rods secured to the tongue at a distance from the rear end thereof and directly connected, respectively, with corresponding ends of the axles of said gangs, movable adjusting draft-connections from the tongue to the corresponding opposite ends of said axles, the rear end of the tongue being loosely and movably supported by the disk-gangs, so that the entire draft on the gangs is attached directly to the axles thereof through said draft-rods, and so that the said gangs can move together in the line of draft independently of said tongue, substantially as set forth.

11. In combination, the draft-tongue, two disk-gangs each having an upwardly-extending frame, a support connecting the upper centers of said frames to allow horizontal swing of the gangs, said support carrying the rear end of the tongue and allowing independent movement between the support and tongue in the line of draft, and the stationary and movable draft rods or connections connected to the tongue at a distance from its end and secured to the disk-gangs, substantially as described.

12. In combination, the draft-tongue, two disk-gangs, a support for the rear end of the tongue to which the gangs are swiveled, said support and tongue being capable of separate independent movement in the line of draft, and the draft rods and connections secured to said tongue at a distance from its rear end and directly connected to opposite ends of the gang-axles, substantially as described.

13. In combination, a draft-tongue, two disk-gangs each having an upwardly-extending frame, a support for the rear end of the tongue, said frames at their upper central portions being respectively swiveled to opposite ends of said support, the stationary draft-rods from the tongue respectively to the outer ends of said gangs, and the movable draft-connections from holding and adjusting means on the tongue to the inner ends of said gang-axles, substantially as described.

In testimony that I claim the foregoing as my own I affix my signature in presence of two witnesses.

PETER E. LITTLE.

Witnesses:
GRANVILLE L. ORT,
WEBSTER W. SHUEY.